(12) United States Patent
Raab et al.

(10) Patent No.: US 11,977,212 B2
(45) Date of Patent: May 7, 2024

(54) STAND FOR AN OPTICAL OBSERVATION UNIT, OPTICAL OBSERVATION APPARATUS, METHOD FOR CALIBRATING AN OPTICAL OBSERVATION APPARATUS, AND COMPUTER PROGRAM

(71) Applicant: Carl Zeiss Meditec AG, Jena (DE)

(72) Inventors: Andreas Raab, Neuler (DE); Jonathan Essig, Neresheim (DE); Dominik Scherer, Aalen (DE); Christian Voigt, Abtsgmuend (DE); Stefan Saur, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 670 days.

(21) Appl. No.: 17/100,406

(22) Filed: Nov. 20, 2020

(65) Prior Publication Data
US 2021/0157112 A1   May 27, 2021

(30) Foreign Application Priority Data
Nov. 22, 2019 (DE) ..................... 10 2019 131 646.4

(51) Int. Cl.
*G02B 21/00* (2006.01)
*B25J 9/16* (2006.01)

(52) U.S. Cl.
CPC ........ *G02B 21/0012* (2013.01); *B25J 9/1697* (2013.01); *B25J 9/1692* (2013.01)

(58) Field of Classification Search
CPC ............... G02B 21/0012; G02B 21/00; G02B 21/0004; G02B 21/24; G02B 21/36; G02B 21/362; G02B 21/368; G02B 27/62; B25J 9/1697; B25J 9/1692
USPC .... 359/368, 362, 363, 369, 384; 702/85, 94, 702/95
See application file for complete search history.

(56) References Cited

U.S. PATENT DOCUMENTS

| 2,112,449 A | 3/1938 | Proudfit |
| 2015/0248003 A1* | 9/2015 | Li .......................... G02B 21/36 348/80 |
| 2017/0066131 A1 | 3/2017 | Kamikawa et al. |
| 2020/0004003 A1 | 1/2020 | Omlor et al. |

(Continued)

FOREIGN PATENT DOCUMENTS

| DE | 10 2016 225 613 A1 | 6/2018 |
| DE | 10 2018 115 824 A1 | 1/2020 |
| DE | 10 2018 125 422 A1 | 4/2020 |

(Continued)

OTHER PUBLICATIONS

English translation and Office action of the German Patent Office dated Jul. 22, 2020 in German patent application 10 2019 131 646.4 on which the claim of priority is based.

(Continued)

*Primary Examiner* — Arnel C Lavarias
(74) *Attorney, Agent, or Firm* — Walter Ottesen, P.A.

(57) ABSTRACT

To simplify the optical calibration of an optical observation apparatus, a stand for an optical observation unit including a calibration object arranged directly on the stand in a fixed location is specified. Moreover, an optical observation apparatus, which includes such a stand and an optical observation unit connected to the stand, a method for calibrating such an optical observation apparatus, and a computer program are specified.

18 Claims, 7 Drawing Sheets

(56) References Cited

U.S. PATENT DOCUMENTS

2020/0016758 A1    1/2020  Keller et al.

FOREIGN PATENT DOCUMENTS

JP         2004070036 A   *   3/2004
TW             I420144 B   *  12/2013

OTHER PUBLICATIONS

Tsai, R. et al, "A New Technique for Fully Autonomous and Efficient 3D Robotics Hand/Eye Calibration", IEE Transactions on Robotics and Automation, vol. 5, No. 3, Jun. 1989, pp. 345 to 358.

* cited by examiner

STAND FOR AN OPTICAL OBSERVATION UNIT, OPTICAL OBSERVATION APPARATUS, METHOD FOR CALIBRATING AN OPTICAL OBSERVATION APPARATUS, AND COMPUTER PROGRAM

CROSS REFERENCE TO RELATED APPLICATION

This application claims priority of German patent application no. 10 2019 131 646.4, filed Nov. 22, 2019, the entire content of which is incorporated herein by reference.

FIELD OF THE INVENTION

The disclosure relates to a stand for an optical observation unit, an optical observation apparatus, a method for calibrating an optical observation apparatus, and a computer program.

BACKGROUND OF THE INVENTION

Surgical microscopes are used in various medical disciplines, such as ophthalmic surgery, dental surgery or neurosurgery. Here, microscopes for neurosurgery have the greatest technical complexity since interventions on the brain usually require assistance by way of numerous add-on functions on account of their significant criticality and great variety. In addition to the basic functionality of imaging the site, visualization using fluorescence, navigation, and tracking of instruments (tool tracking), for example, also play a role.

On account of the increasing complexity of surgical microscopes, there is an increased need for testing, adjustment and calibration methods to test the functionality and to be able to undertake changes or apply specific settings where necessary. These methods, which are subsumed by the term calibration method below, can be carried out during the intended use of the surgical microscope, or else within the scope of manufacture, and servicing and upkeep. Calibration methods within the aforementioned meaning may include, inter alia: diopter settings on the eyepiece, checking and setting the X, Y, Z-position of cameras and other optical components, checking and setting intrinsic camera parameters, temporal calibration of cameras, checking and setting zoom and autofocus, establishing the absolute fluorescence intensity, checking and setting the kinematics of the stand for improving the absolute positioning accuracy.

These and similar tests frequently require the use of an optical calibration object, which is also referred to as a calibration standard, calibration target or marker. The latter is arranged, in a targeted fashion, in front of the main objective of the surgical microscope or at defined positions with respect to the stand, for example, at the beginning of the calibration method, for example, before images are recorded. Here, many calibration methods require an accurate, controlled geometric alignment of the calibration object.

The manual attachment and alignment of the calibration object is a time-consuming and strenuous procedure which is susceptible to errors; it can only be carried out with difficulties, even by trained servicing staff, and it may not be able to be carried out at all by an untrained user. Moreover, additional equipment is required, which needs to be purchased, carried along and/or stored. This significantly increases the outlay for carrying out the calibration methods.

Exemplary calibration methods and their implementation in accordance with the prior art are briefly explained below.

Adjusting the diopter setting on the eyepiece allows the eyepiece to be adapted to the refractive error of the user, for example, a technician or a surgeon. For this setting, the microscope is positioned in perpendicular fashion above a plane object, for example, a written sheet of paper, which serves as a calibration object, according to one current calibration method. Subsequently, the eyepieces are set at the eye spacing on the binocular tube such that the two eyepiece images fuse into an image. Subsequently, the smallest magnification value is set on the microscope, with a working distance that is as short as possible being chosen. Now, the diopter adjustment ring on the eyepiece is set to 0 diopter. Then, the user peers through the eyepiece and brings the image into focus. Subsequently, the microscope is set to the largest magnification value and corrected using the fine focusing until a focused image is obtained. Subsequently, the smallest magnification value is set once more, without the working distance being altered. Now, the diopter adjustment ring on the eyepiece is set to the maximum plus diopter value, for example, +5 dpt. The user peers through the eyepiece again and turns the diopter adjustment ring in the direction of minus diopters until a focused image is obtained. The entire procedure must subsequently be repeated for the second eyepiece. The process might have to be repeated should refocusing nevertheless be required in the case of an adjustment of the magnification value.

This complicated process is considered bothersome by many users and often not carried out. As a consequence, work is carried out using a microscope that has not been adjusted to the refractive error of the user. Additionally, a further problem occurs when a video camera is used. This is because the visual focus and the video focus lie in different planes in this case, as a result of which only the visual image or only the video image can be seen in focus.

The calibration of cameras and other optical components include, for example, the adjustment of the xy-offset when using separate cameras for the left and right imaging channel (intrinsic adjustment) and the mechanical X, Y, Z-adjustment of the cameras relative to the optical path.

To check and set the surroundings camera for tracking instruments, the (hand-held) surgical instrument to be tracked is provided with a two-dimensional (2D) calibration object. The calibration object is filmed by a camera attached to the microscope and its relative position in the operating field is calculated. Via appropriate driving of the motor-driven stand of the microscope, it is possible for the optical axis of the microscope to track the tip of the surgical instrument.

An intrinsic calibration of the surroundings camera is required in order to facilitate this. The intrinsic parameters serve to re-establish the relationship between the camera coordinate system and image coordinate system. Moreover, the distortion coefficients of the optical unit can be determined.

A further precondition for tracking instruments is the calibration between the coordinate origin of the surroundings camera and a physical point on the microscope since the movement of the instrument recognized in the surroundings camera must be carried out in the coordinate system of the microscope. On account of the coordinate origin of the surroundings camera corresponding to no physical point on the surroundings camera, the former cannot be measured geometrically. Therefore, methods such as the hand/eye calibration are required to carry out this calibration.

To check and set internal cameras, for example for the topographic reconstruction of the surface of the site via at least two cameras of a stereoscopic microscope or for expanded representations (augmentation), an intrinsic calibration (see the explanation above) and an extrinsic calibration are required. In the case of the extrinsic calibration, the spatial arrangement of the cameras, that is, the rotation and translation thereof, with respect to one another is ascertained. Since the cameras in a surgical microscope are arranged in the optical path downstream of a movable lens system for zoom and focus, there is a particular challenge in carrying out the calibration for any zoom and focus values and compensating tolerances in the motors which move the lenses for zoom and focus. An accurate calibration is also required if image data of a camera should be superposed on image data of another camera or be used for augmentation purposes thereon.

The quality of the results of some applications depends on the absolute positioning accuracy of the stand of the microscope. Examples of this include the pivoting of the microscope about the focal point or the off-line positioning in relation to certain positions in space, for example, within the scope of tool tracking. The absolute positioning accuracy of the stand depends, in turn, on the exact knowledge of the kinematic parameters of the stand, which may deviate from the nominal values on account of usual assembly and manufacturing tolerances.

By way of example, the stand kinematics can be calibrated by virtue of one or more defined points in space being approached in different orientations of the stand. In the specific example of a surgical microscope, this can be realized by virtue of the optical unit of the surgical microscope being aligned on a calibration object. Together with the camera calibration, it is then possible to determine the actual position and orientation of the surgical microscope relative to the calibration object. In knowledge of the fact that the calibration object is arranged at the same locations in all positions, the deviation of the actual position from the nominal position of the surgical microscope represents the variable of the calibration algorithm to be minimized. In order to be able to calibrate a larger working region, it is also possible to use a plurality of calibration objects with the fixed and known position with respect to one another.

Usually, the calibration objects are arranged in space in order to optimize or calibrate their absolute positioning relative to the space. On account of the mobile and therefore changeable setup of a surgical microscope in space, it is, however, predominantly the calibration relative to the base of the microscope that is of interest. However, this requires an exact arrangement of the calibration objects relative to the stand.

US 2017/0066131 A1 has disclosed a calibration method for a robot arm apparatus for minimizing deviations between a coordinate system of an internal model for controlling the apparatus and the coordinate system in real space. The robot arm apparatus includes an arm unit with a plurality of links connected to one another in articulated fashion and an image capturing unit, for example, a microscope, that is connectable to the arm unit. To carry out the calibration method, a reference point is detected as a reference object in real space. The reference point can be defined as a specific point on a holding device connected to the arm unit. The connection between arm unit and holding device is releasable in order to facilitate an interchange and a different positioning of the holding device. A possible movement of the holding device, and hence of the reference point, in relation to the arm unit and the image capturing unit may however lead to incorrect calibrations or possible movements need to be taken into account with great outlay during the calibration. Moreover, a manual alignment of the holding device on the reference point is required after each interchange.

Further calibration methods are known from the field of diagnostic and therapeutic manipulator systems. Such systems require a calibration in order to increase the repetition accuracy and absolute accuracy when using the manipulator. Thus, US 2020/0016758 A1 discloses a method for calibrating a manipulator of a manipulator system including an imaging apparatus, wherein a target pose is driven to via the manipulator in a first method step. Subsequently, an image of part of the manipulator or of an end effector of the manipulator is captured via the imaging apparatus. Using the captured image, the actual pose of the manipulator and the deviation between the actual pose and target pose are determined. A calibration parameter used to calibrate the manipulator is calculated on the basis of the deviation. Optionally, a marker can be attached to the manipulator or the end effector, the marker also being captured when the image is captured. However, marker and imaging apparatus are arranged separately from one another; that is, the position of the marker with respect to the imaging apparatus can change, for example, in the case of a repositioning of the manipulator system following transportation. This leads to a deviation of the position of the manipulator system in the target pose with respect to the imaging apparatus, as a result of which the calibration can be influenced in disadvantageous fashion.

SUMMARY OF THE INVENTION

It is an object of the present invention to specify a stand for an optical observation unit and an optical observation apparatus with improved options for an optical calibration. Additionally, it is an object of the invention to specify an improved calibration method and a computer program product, which facilitates the implementation of the method.

This object can, for example, be achieved by a stand for an optical observation unit, the stand including: a stand body; and, a calibration object arranged directly on the stand body in a fixed location.

This object can, for example, also be achieved by an optical observation apparatus including: a stand; a calibration object arranged directly on the stand in a fixed location; and, an optical observation unit connected to the stand.

This object can, for example, also be achieved by a method for calibrating an optical observation apparatus having a stand, a calibration object arranged directly on the stand in a fixed location, and, an optical observation unit connected to the stand and having a camera. The method includes: making recordings of the calibration object via the camera of the optical observation unit; and, evaluating the recordings.

The object can, for example, further be achieved by a computer program including program code configured to, when executed by a processor, cause an optical observation apparatus having a stand, a calibration object arranged directly on the stand in a fixed location, and, an optical observation unit connected to the stand to carry out the aforementioned method.

A basic concept of the invention is that of arranging a calibration object on a stand of an optical observation apparatus, for example, of a surgical microscope. The calibration object can be observed or recorded by an observation unit of the observation apparatus. To this end, the observation unit can be positioned in a reference position via a stand of the observation apparatus. Subsequently, a calibration can be carried out on the basis of the observed or recorded calibration object.

A first aspect of the disclosure relates to a stand for an optical observation unit including a calibration object arranged directly on the stand in a fixed location.

The stand serves to position, align and hold an optical observation unit, for example of a surgical microscope. To this end, the optical observation unit can be connected to the stand via a mount. To achieve this object, the optical observation unit held by the stand should firstly be able to be positioned with as little resistance as possible. Secondly, the observation unit, once positioned, should be able to be held securely in its position. Additionally, the stand can achieve further objects of, for example, facilitating a tracking of instruments by virtue of the observation unit being moved in a targeted fashion via the stand.

In order to be able to achieve these objects, the stand includes a plurality of stand links, interconnected in secured or articulated fashion, for example a height-adjustable stand column, a support arm, a spring arm, and a mount for the optical observation unit. Moreover, provision can be made of a stand base, on the underside of which devices, for example, rollers, for displacing the stand may be applied. The specific configuration of the stand depends, inter alia, on the dimensions of the optical observation unit, the desired application, for example, during an operation, and the space available at the setup location.

The stand can have a motor-driven embodiment such that positioning and alignment of the optical observation unit can be facilitated by an appropriate control of the motors of the stand. For this purpose, the stand can be signal-connected to a control unit.

A calibration object is arranged on the stand directly and in a fixed location. Directly can mean that the calibration object is immediately and non-detachably connected to the stand, for example, adhesively bonded, welded, et cetera, thereto, or it is even formed by part of a geometric structure of the stand itself. There is the option of displaying the calibration object on a monitor that is fastened to the stand. In a fixed location can mean that a position of the calibration object with respect to the stand link on which it is arranged cannot be changed during intended use. Expressed differently, the calibration object cannot be displaced, twisted, et cetera, with respect to this stand link. Equally, the calibration object can move together with this stand link in relation to the other stand links. A complete detachment of the stand link together with the reference object arranged thereon from the remaining stand is not provided for in the assembled state of the stand. Thus, the calibration object is always connected, that is, permanently connected, to the stand; that is, it always forms part of the stand.

The calibration object should be arranged on the stand in such a way that it is observable via an observation unit that is connectable to the stand. By way of example, the calibration object can be observable via the observation unit from a specifiable reference position; that is, the observation unit is in a reference position when observing the calibration object. Naturally, a plurality of reference positions could also be provided, for example in order to be able to observe the calibration object from different observation angles. Observing the calibration object can be understood to mean a procedure in which the calibration object is observed in full or in part via one or more cameras of the observation unit. Image or video recordings of the calibration object can be made during the observation; these can be used in various calibration methods.

The specific arrangement of the calibration object may depend on the type of calibration methods to be carried out. For the calibration of cameras, the calibration object should be located completely within the field of view of the respective camera. The calibration object can be arranged in such a way that it can be observed from different viewing angles by a plurality of cameras of the observation unit. For a camera calibration, for example, a calibration of the image sharpness, of the three-dimensional image impression, the calibration object can be arranged orthogonal to the beam entry surface of the camera. By contrast, should a calibration of the kinematics of the stand be carried out, an arrangement of the calibration object as close as possible to, or in the vicinity of, the stand base is recommended.

The specific arrangement of the calibration object on the stand depends, inter alia, on the geometric configuration of the calibration object and of the stand and the observation unit to be used and the arrangement thereof on the stand. In any case, the calibration object must be arranged in such a way that it can be observed by at least one camera of the observation unit. By way of example, an arrangement of the calibration object on the lower side of the stand base, that is, on the standing area of the stand, would not be sufficient to this end. Rather, it is thus necessary for a line of sight to be establishable between the observation unit fastened to the stand and the calibration object, possibly after a suitable movement of the stand links and/or the observation unit connected to the stand.

As described at the outset, the calibration object serves to carry out calibration methods and usually has characteristic points, for example, corners of a checkerboard pattern, which can be reliably and accurately detected by the observation unit and the relative position, arrangement, alignment, et cetera, of which is used for the respective calibration method.

The direct arrangement of the calibration object on the stand in a fixed location brings about a repeatability of the calibrations carried out via the calibration object with a high repetition accuracy. It is no longer necessary to manually attach the calibration object. As a result, the calibration methods can be automated; that is, the calibrations can be carried out without intervention, or at best with little intervention, by a user, for example, a technician or surgeon. The time outlay for carrying out the calibrations can be reduced. Moreover, it is no longer necessary to purchase and store a separate calibration object.

According to various embodiment variants, the calibration object can be a two-dimensional calibration pattern, a three-dimensional calibration body or part of the stand.

By way of example, a two-dimensional calibration pattern can be embodied as a checkerboard pattern, a point pattern, a QR code, a logo or the like. It is easily and cost-effectively possible to produce such a calibration pattern and arrange the latter on the stand, for example, via printing, laser engraving or adhesive bonding.

A three-dimensional calibration body can include a main body that is transparent in the spectral range employed, that is, for example, in the visible spectral range, and one or more non-transparent calibration marks arranged in the main body. Such a calibration body facilitates a calibration in three dimensions.

Optionally, some of the calibration marks can be selectively activatable and deactivatable, wherein an activated calibration mark is visible in the spectral range employed and a deactivated calibration mark is not visible in the spectral range employed. Furthermore, the calibration marks can be activated and deactivated in different planes of the transparent main body. By virtue of at least some of the calibration marks being activatable and deactivatable, it is possible to largely avoid shadowing, that is, coverage, of lower lying calibration marks by higher lying calibration marks as a result of a suitable activation and deactivation of calibration marks.

Furthermore, there is the option of providing a pattern of calibration marks in the main body. The pattern of calibration marks can have a distribution of the calibration marks, the spatial frequency of which changes within the calibration element. Alternatively, the pattern of calibration marks can have a self-similar distribution of the calibration marks. A calibration of sufficient quality can be realized for both low and high zoom levels using the pattern, whose distribution of calibration marks has a changing spatial frequency, or using the pattern of calibration marks which has a self-similar distribution of calibration marks. In respect of further details of possible three-dimensional calibration bodies, reference is made to the subsequently published German patent application with the file reference 10 2018 115 824.6, filing date Jun. 29, 2018 (which corresponds to US 2020/0004003 A1), which considers such calibration bodies in detail.

The calibration object can be embodied in such a way that the structures, marks, et cetera, used for the calibration are visible in the visible spectral range, for example, in a conventional white light image. In addition or as an alternative to the visible spectral range, the structures, marks, et cetera, used for the calibration can be visible in a different spectral range, for example, in the infrared spectral range.

The calibration object can have a passive, that is, always present, embodiment, for example, as a printed pattern, or it can have an activatable and deactivatable embodiment. Activatable and deactivatable means that the calibration object or the structures, marks, et cetera, used for the calibration can be activated or deactivated according to need, for example, by targeted driving of light-emitting diodes or in the form of a calibration pattern that is dynamically displayed on a monitor.

The calibration object can also be part of the stand, that is, worked into the geometry thereof, for example, in the form of a corner or a logo. This can facilitate an improved esthetic design. Moreover, the calibration object requires no further space, and so the calibration object permanently arranged in a fixed location does not have a bothersome effect, even in the case of restricted spatial conditions.

A further aspect of the disclosure relates to an optical observation apparatus including a stand according to the description above and an optical observation unit connected to the stand. Therefore, the explanations made above for the purposes of explaining the stand also serve to describe the optical observation apparatus. The calibration object is arranged on the stand in such a way that it is viewable or observable via the observation unit.

The observation unit can include one or more cameras that can be used to generate photo or video recordings of an observation object or observation region, for example, of the site. By moving the stand it is likewise possible to move the observation unit, and so different observation positions can be adopted. By way of example, the optical observation apparatus can be embodied as a surgical microscope.

The advantages of the stand according to the disclosure are correspondingly connected with the optical observation apparatus.

According to various embodiment variants, the optical observation apparatus can include a control unit which is configured and embodied to output control signals to the stand and/or the observation unit in order to carry out a calibration method.

To this end, there can be a signal-transmitting operative connection between the control unit and motors of the stand and/or adjustment devices of the observation unit such that it is possible to output control signals which bring about certain positioning of the stand and the observation unit required to carry out a calibration method.

By way of example, the output of the control signals can be implemented as a consequence of an input using an input unit connected to the control unit, for example should a user manually initiate a calibration method by way of an appropriate input. Alternatively, the control signals can be output in response to the presence of other triggers, for example, expiry of a specifiable time duration, expiry of a specifiable use duration of the optical observation apparatus, a change in the location of the optical observation apparatus, an excessive deviation of an actual value from a target value, et cetera.

The control unit facilitates a partly or fully automated performance of a calibration method, and so the calibration can be carried out with little outlay in terms of time and staff, for example, even without the presence of the user. Thus, calibration methods can also be carried out outside of the period of use of the optical observation apparatus, for example, at night or over the weekend. Moreover, the number of error sources is reduced as a result of the automation, since a user intervention is not required or only required to a small extent. The reliability and reproducibility of the measurement results obtainable by the optical observation apparatus can be increased as a result.

A further aspect of the disclosure relates to a method for calibrating an optical observation apparatus according to the preceding description. Therefore, the explanations made above for the purposes of explaining the optical observation apparatus also serve to describe the method. The method can be wholly or partly carried out in computer-implemented fashion and, as a consequence, in wholly or partly automated fashion. The advantages of the optical observation apparatus are correspondingly connected to the method, and so reference can be made to the explanations in respect of the former.

A calibration can be understood to mean the ascertainment of the relationship between an actual (measurement) value of the optical observation apparatus and a (measurement) value defined as normal under specified conditions. Subsequently, the ascertained relationship is taken into account, for example, in the form of a correction factor or an adjustment in the settings of the optical observation apparatus. The calibration can also include a determination of the conversion of one physical variable into another. By way of example, an intrinsic calibration can include, inter alia, a conversion of pixel values into mm values.

The method includes the following steps: producing recordings of the calibration object via one or more cameras of the observation unit and evaluating the produced recordings.

Initially, one or more recordings of the calibration object, for example, photo or video recordings, are produced. By way of example, recordings can be produced from different observation angles and/or from different distances, for example by virtue of the stand being displaced or aligned accordingly. Moreover, the recordings can also be produced by different cameras of the observation unit.

The recordings produced are evaluated in a further method step. By way of the evaluation, it is possible to obtain correction factors via which it is possible to take account of the relationship between an actual (measurement) value of the optical observation apparatus and a (measurement) value defined as normal.

Optionally, the calibration object can be activated before the recordings are produced, for example by virtue of the calibration object being illuminated or self-luminous calibration object being activated to shine.

By using the calibration object directly arranged on the stand in a fixed location, the method can advantageously be carried out, in full or in part, in an automated fashion.

According to various embodiment variants, the optical observation unit can be aligned with respect to the calibration object before the recordings of the calibration object are produced.

The optical observation unit can be aligned with respect to the calibration object in a manual fashion or, in preferred configurations of the method, in an automated fashion. A robotic stand can be used for an automated alignment.

Expressed differently, the observation unit can initially be positioned in such a way that the calibration object can be viewed or observed by cameras of the observation unit and photo or video recordings of the calibration object can be produced.

By way of example, the observation unit can be aligned in a test position or reference position. The reference position is a position of the observation unit which is accurately defined and consequently can be repeatedly adopted with high accuracy. In addition to the x, y, z-coordinates, the reference position can be defined on the basis of further parameters, for example, observation angle, focal distance, zoom, et cetera. Via the reference position, it is possible to easily repeat the calibration methods with high accuracy. Possible deviations can be identified quickly. Depending on the specific calibration method, the alignment of the observation unit in a reference position can be merely advantageous or even required. By way of example, aligning the observation unit in a reference position is necessary when calibrating cameras of the observation unit. To this end, the reference position is defined by way of the zoom, focal distance, and observation angle with respect to the reference object.

The reference position can be defined in such a way that the entire calibration object can be captured by the image sensor of the observation unit. As a result, the accuracy of the calibration can be improved.

A number of advantages can be linked to an automated alignment. Thus, the entire calibration method may be automated. As a result, the calibration method can even be started by non-specialist staff, for example a theater nurse, for example, by operating a simple start button. After the start, the calibration method can run in fully automated fashion.

Furthermore, an automated alignment can improve the time efficiency over a manual alignment since the desired positioning usually cannot be set immediately within the scope of a manual alignment and the desired positioning is approached in iterative fashion instead. By contrast, the desired positioning can be set immediately within the scope of an automated alignment.

Moreover, the reproducibility can be improved via an automated alignment and a completely automated calibration method facilitated thereby. By way of example, when recording batches from different angles, an automated calibration method can ensure that the same protocol is always run through, for example to guarantee that the entire chip surface is also taken into account within the scope of an intrinsic calibration.

According to various embodiment variants, the method can include the use of the evaluated recordings for carrying out an adjustment to a diopter setting on an eyepiece of the optical observation unit.

Expressed differently, the evaluated recordings can be used to adjust the diopters on an eyepiece of the optical observation unit. As a result of this, there is the option of matching the eyepiece to a refractive error of the user.

According to further embodiment variants, the method can include the use of the evaluated recordings in a calibration of cameras of the optical observation unit.

Here, a three-dimensional calibration body can be used as a calibration object in order to be able to ascertain an offset between an actual position and a target position of the cameras of the optical observation unit. By ascertaining the offset, it is possible to counter the problem of the reproducibility with which a reference setting can be approached via the motor-driven stand possibly not being sufficient in the case of a highly accurate calibration of the cameras. The three-dimensional calibration body can have illuminated structures which are arranged in a plurality of planes.

According to further embodiment variants, the method can include the use of the evaluated recordings in an intrinsic calibration and/or in a hand/eye calibration of cameras of the optical observation unit.

In such a method, a checkerboard pattern can be used as the calibration object. The camera can be a surroundings camera with a fixed focal length and without a zoom system.

According to further embodiment variants, the method can include the use of the evaluated recordings in an extrinsic calibration of internal cameras for topography and/or augmentation applications.

The term "internal camera" can be understood to mean a camera that is mechanically securely connected to the optical observation apparatus, for example also a surroundings camera arrangeable on the optical observation apparatus, which camera is optionally mountable and dismountable.

According to further embodiment variants, the method can include the use of the evaluated recordings in a calibration of kinematics of the stand.

A further aspect of the disclosure relates to a computer program including commands that cause an optical observation apparatus as per the description above to carry out a method for calibrating the optical observation apparatus.

A computer program can be understood to mean program code that is storable on a suitable medium and/or retrievable from a suitable medium. Consequently, the computer program can be stored on a computer-readable data medium. Furthermore, a data carrier signal can be formed, which transmits the computer program.

Any medium suitable for storing software, for example a nonvolatile memory installed in a controller, a DVD, a USB stick, a flash card or the like, can be used to store the program code. By way of example, the program code can be called via the Internet or an intranet or via another suitable wireless or wired network.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
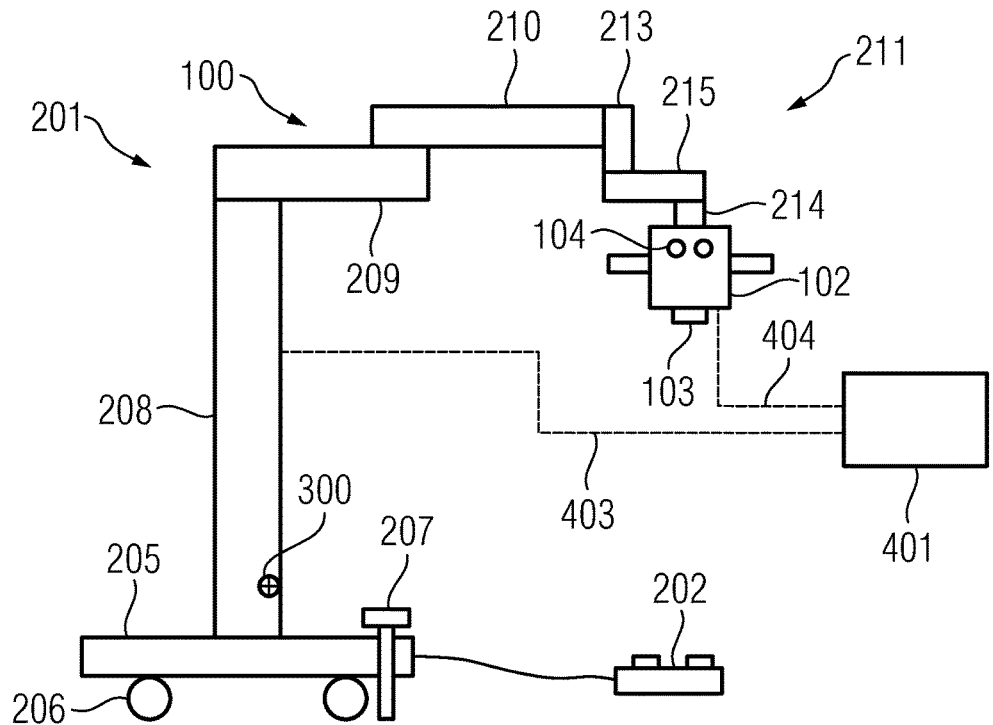
FIG. 1 shows an optical observation apparatus including a stand and a surgical microscope arranged thereon.

FIG. 1 illustrates an optical observation apparatus 100 including a motor-driven stand 201 and an optical observation unit 102 fastened to the stand 201. The optical observation apparatus 100 is a surgical microscope. By entering navigation data, the optical observation unit 102 can be automatically set in terms of its orientation and position, which also allows remote positioning and orientation of the optical observation unit 102 in such a way that a certain section of an object field, for example, the site, is displayed in optimal fashion. For this purpose, a control unit 401 is assigned to the stand 201, the control unit undertaking the positioning and orientation of the optical observation unit 102 on the basis of received position and/or orientation control data by virtue of control signals 403, 404 being output to suitable actuators.

Figure 2:
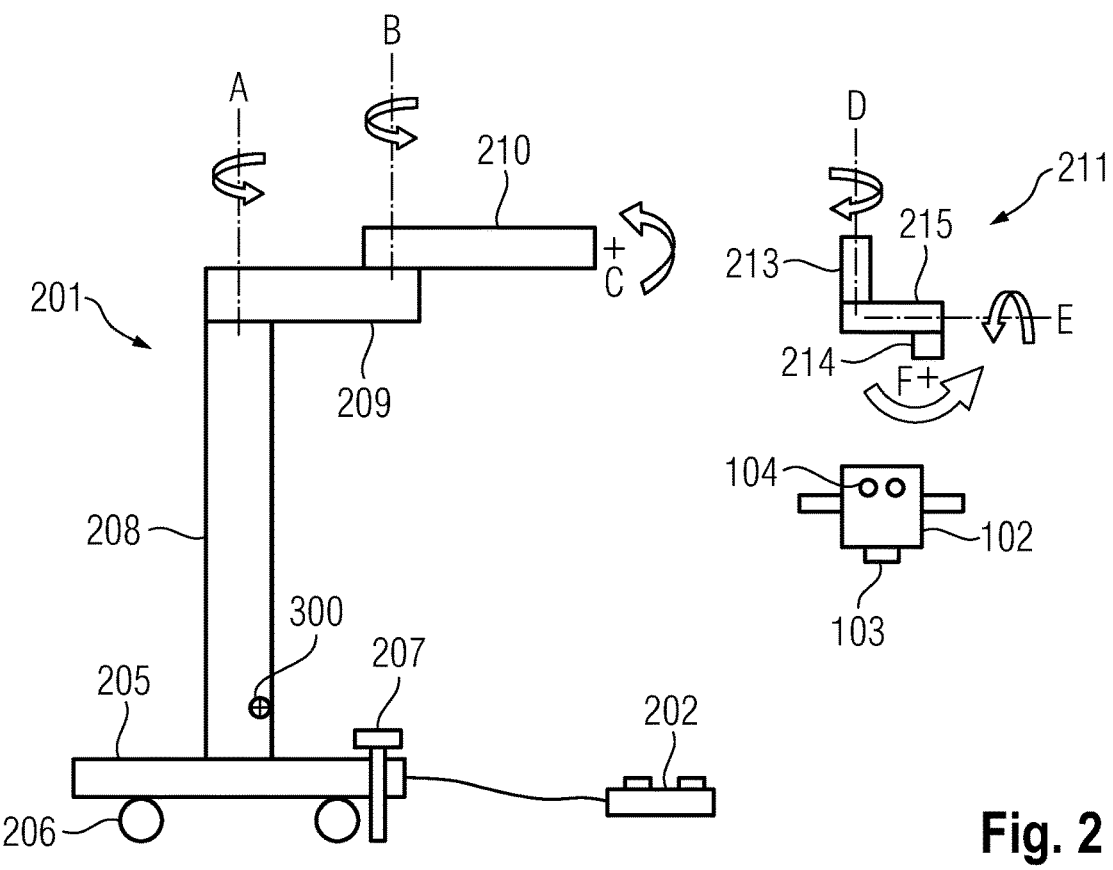
FIG. 2 shows the degrees of freedom made available to the optical observation unit by the stand of FIG. 1 and its mount.

Below, the stand 201 and the degrees of freedom facilitated by the stand for the optical observation unit 102 are described in more detail on the basis of FIGS. 1 and 2. In the example of a stand 201 shown in FIG. 1, the stand rests on a stand base 205 which has rollers 206 on the lower side thereof, the rollers enabling a displacement of the stand 201. In order to prevent an unwanted displacement of the stand 201, the stand base 205 includes a foot brake 207.

As stand links, the actual stand 201 includes a height-adjustable stand column 208, a support arm 209, a spring arm 210 and a mount for the optical observation unit 211, which in turn includes a connection element 213, a swivel arm 215 and a holding arm 214. The degrees of freedom provided by the stand links for positioning the optical observation unit 102 are shown in FIG. 2. At its one end, the support arm 209 is connected to the stand column 208 in a manner rotatable about an axis A. At the other end of the support arm 209, one end of the spring arm 210 is fastened in a manner rotatable about an axis B that is parallel to the axis A such that the support arm 209 and the spring arm 210 form an articulated arm. The other end of the spring arm 210 is formed by a tilt mechanism (not depicted here), on which the mount 211 is fastened and which enables a tilting of the mount 211 about the axis C.

The mount 211 has an axis of rotation D, a swivel axis E and a tilt axis F, about which the optical observation unit 102 can be rotated, swiveled, and tilted, respectively. Using a connection element 213, the mount 211 is fastened at the outer end of the spring arm 210 in a manner rotatable about the axis of rotation D. The axis of rotation D extends along the connection element 213. The connection element 213 is adjoined by a swivel arm 215, with the aid of which the optical observation unit 102, more precisely a holding arm 214 which is attached to the swivel arm 215 and on which holding arm the optical observation unit 102 is fastened via a holder (not illustrated), can be swiveled about the swivel axis E. The swivel axis E extends through the swivel arm 215. The angle between the swivel arm 215 and the connection element 213, that is, the angle between the swivel axis E and the axis of rotation D, can be varied via an adjustment mechanism arranged between the connection part 213 and the swivel arm 215.

The tilt axis F, which enables tilting of the optical observation unit 102, extends through the holding arm 214 in a manner perpendicular to the plane of the illustration. The optical observation unit 102 is fastened to the holding arm 214 via a holder (not illustrated here).

The degrees of freedom of the mount 211 and the adjustment options of the optical observation unit 102, for example, focusing, sharpness, magnification factor, et cetera, can be set by way of an actuating device 202, which is illustrated as a foot control panel in the present embodiment. However, the actuating device 202 can also be realized as a hand-operated switching element or as a combination of foot- and hand-operated switching element. Moreover, a remote control can be facilitated.

A calibration object 300 is arranged in a fixed location directly on the stand 201, to be precise in such a way that it is observable via the observation unit 102 connected to the stand 201. In FIGS. 1 and 2, the calibration object 300 is arranged on the stand column 208. However, alternatively, the calibration object 300 can be arranged differently on the stand 201, for example in the region of the stand base 205 or the support arm 209. Naturally, a plurality of calibration objects 300 may also be present.

The calibration object 300 can be embodied as a two-dimensional calibration pattern, for example, as a checkerboard pattern, or as a three-dimensional calibration body. Alternatively, there is also the option of the calibration object 300 being integrated into the geometrical structure of the stand 201, that is, forming part of the stand 201.

Even if the stand 201 has been described on the basis of a specific example, a person skilled in the art will recognize that differently formed stands can also find use.

Figure 3:
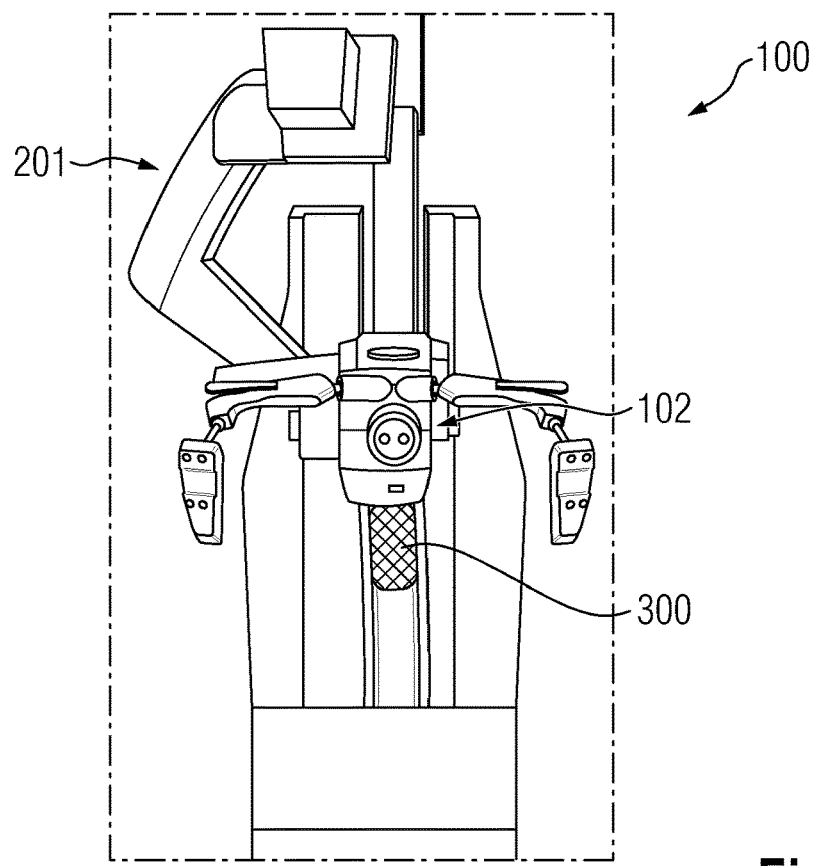
FIG. 3 shows a surgical microscope with a calibration object.

FIG. 3 shows an optical observation apparatus 100 embodied as a surgical microscope, with a disassembled tube. The surgical microscope has a stand 201 and an optical observation unit 102. By way of example, the stand 201 can be embodied as described in relation to FIGS. 1 and 2. The calibration object 300 is arranged in a fixed location in the illuminated region of the stand 201. The calibration object 300 can be observed via the optical observation unit 102 such that it is possible to produce recordings of the calibration object 300 for the purposes of carrying out a calibration method, for example, an adjustment in the diopter setting on an eyepiece.

Figure 4:
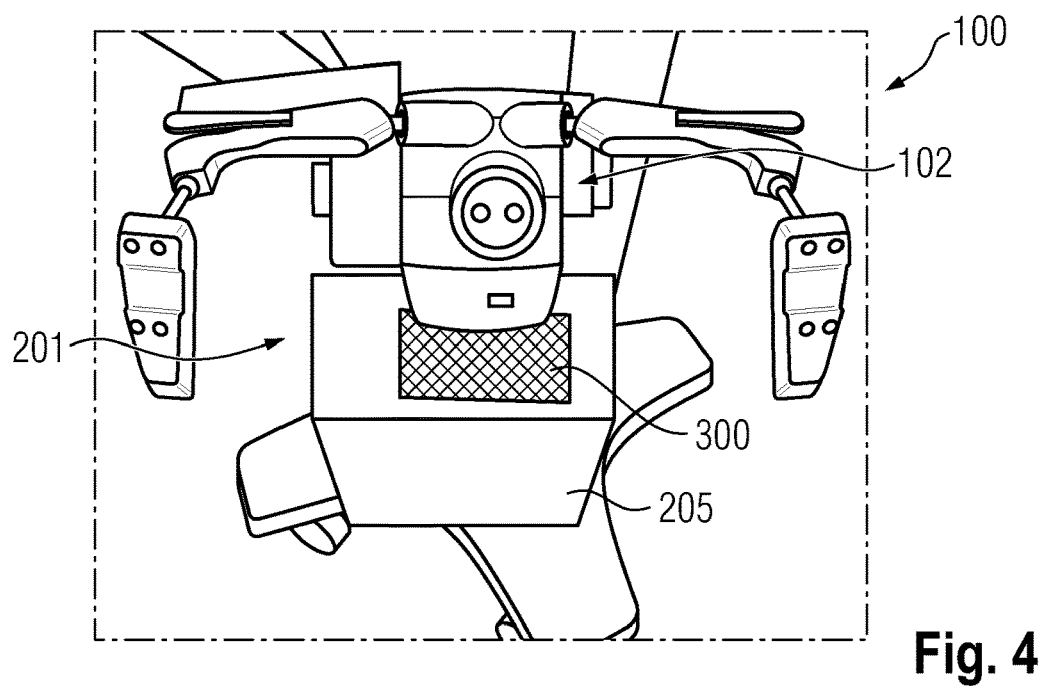
FIG. 4 shows a surgical microscope with a calibration object in the form of a two-dimensional checkerboard pattern.

FIG. 4 shows an optical observation apparatus 100 embodied as a surgical microscope with a calibration object 300 in the form of a two-dimensional checkerboard pattern. The surgical microscope has a stand 201 and an optical observation unit 102. By way of example, the stand 201 can be embodied as described in relation to FIGS. 1 and 2. The calibration object 300 is arranged in a fixed location in the region of the stand base 205. By way of example, the calibration object 300 can be adhesively bonded to the stand base 205. The calibration object 300 can be observed via the optical observation unit 102 such that it is possible to produce recordings of the calibration object 300 for the purposes of carrying out a calibration method.

Figure 5:
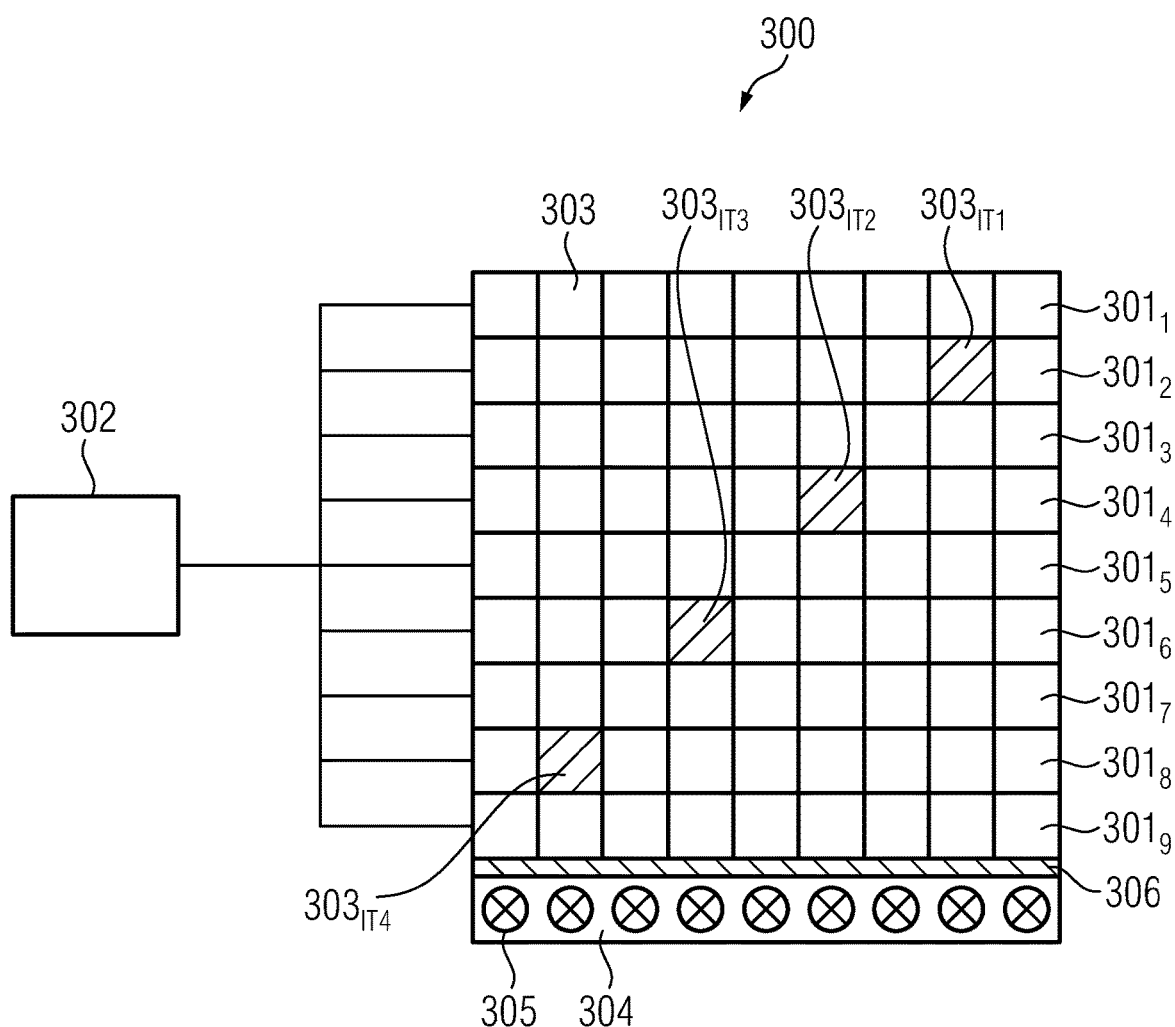
FIG. 5 shows a cross section of a 3D calibration body, which is constructed from a number of display layers.

FIG. 5 shows a calibration object 300, which is embodied as a 3D calibration body. The calibration body includes a transparent body and calibration marks embedded in the volume of the transparent body. At least some of the calibration marks are selectively activatable and deactivatable, wherein an activatable calibration mark is visible in the visible spectral range and a deactivated calibration mark is not visible in the visible spectral range. It is understood that, as a rule, the transparent body is not 100% transparent. Variations in the transparency may also be present. The volume of the calibration body should therefore always be considered to be transparent if the Michelson contrast in the body is less than 0.2, in particular less than 0.1, apart from at the points at which the calibration marks are situated.

As illustrated in FIG. 5, such a 3D calibration body can be substantially constructed from a stack of transparent displays $301_1$ to $301_9$, which can be driven individually via a controller 302. Each display $301_1$ to $301_9$ is constructed from a plurality of pixels 303, which can be individually switched into a transparent or into a non-transparent state via the controller 302. In the present embodiment, the transparent displays $301_1$ to $301_9$ form a substantially cuboid transparent body, in which most of the pixels 303 are in a transparent state. By contrast, the pixels $303_{IT1}$ to $303_{IT4}$ depicted in hatched fashion in the figure are in a non-transparent state. In the present embodiment, use is made of LCD displays $301_1$ to $301_9$, the pixels 303 of which are transparent or non-transparent, depending on the voltage applied. The stack of displays of $301_1$ to $301_9$ is illuminated by an illumination panel 304 arranged at the lower edge of the 3D calibration body, the illumination panel including light sources 305 which ensure a background illumination of the displays $301_1$ to $301_9$. A diffuser plate 306 for equalizing the illumination intensity is situated between the illumination panel 304 and the stack of displays $301_1$ to $301_9$.

In the illustration of FIG. 5, the individual displays $301_1$ to $301_9$ are switched in such a way that the non-transparent pixels $303_{IT1}$ to $303_{IT4}$ lie in a plane of the substantially cuboid transparent body formed by the transparent displays $301_1$ to $301_9$, the plane running through the body in diagonal fashion. However, they may also be switched in any other way, for example in such a way that they lie in a horizontally extending plane, for example by virtue of only pixels of the display 3015 being switched to be non-transparent. It is likewise possible to switch pixels 303 that lie on an imaginary curved area to be non-transparent.

Moreover, unlike what is shown in FIG. 5, it is not necessary for the non-transparent pixels $303_{IT1}$ to $303_{IT4}$ to have constant distances from one another. Instead, pixels 303 of the displays $301_1$ to $301_9$ can be switched to be non-transparent in such a way that the density of non-transparent pixels $303_{IT1}$ to $303_{IT4}$ is higher at the center of the 3D calibration body than at the edge of the 3D calibration body. In this way, it is possible to create a pattern of calibration marks, the pattern having a variable spatial frequency.

Furthermore, it is possible to configure calibration marks situated further from the center of the 3D calibration body to be larger than calibration marks lying closer to the center of the 3D calibration body. Larger calibration marks can be obtained by virtue of calibration marks situated at the edge being formed by a larger number of adjacent pixels of the displays $301_1$ to $301_9$ than small calibration marks. What can be achieved as a result of using a pattern with calibration marks of different sizes is that, in the case of different zoom levels, the calibration marks in the images recorded with the different zoom levels substantially have the same size and distances that are suitable for the calibration.

Only a small section of the image is visible in the case of high zoom levels, for example the center of the 3D calibration body; by contrast, the entire calibration body is visible at low zoom levels. Moreover, high zoom levels show smaller structures than low zoom levels, and so the small, tightly adjacent, small calibration marks in the center of the pattern can find use in a high zoom level and the less densely packed, larger calibration marks at the edge of the pattern can be used at low zoom levels. Here, it is also possible, in principle, for a pattern with a constant spatial frequency, that is, a pattern with constant distances between the calibration marks in the entire calibration body, to be superposed on a pattern of calibration marks with a variable spatial frequency, that is, with distances of the calibration marks from one another, which distances vary over the calibration body.

As an alternative to the patterns described until now, it is also possible to generate self-similar patterns of calibration marks with the aid of the displays $301_1$ to $301_9$. By way of example, a checkerboard-like pattern of calibration marks can be formed, wherein the calibration marks can be formed by a square area in which a number of pixels 303 are switched to be non-transparent. Between these calibration marks there are square areas of identical size, in which all pixels 303 are switched to be transparent.

However, not all pixels 303 in a calibration mark are switched to be non-transparent; instead, the calibration mark itself represents, in turn, a checkerboard-like pattern made of now smaller square calibration marks with transparent square areas of identical size situated therebetween. The smaller calibration marks can also be formed by a display region in which a number of pixels 303 are switched to be non-transparent and a number of pixels 303 are switched to be transparent. In this way, each of the small calibration marks, in turn, still consists of a checkerboard-like pattern, which is formed of even smaller calibration marks with transparently switched pixel regions situated therebetween.

This can be continued until a checkerboard-like pattern of individual pixels 303 of the displays $301_1$ to $301_9$, which are alternately switched to be transparent and non-transparent, is present. The pattern can either be a pattern formed within a single display $301_1$ to $301_9$ or be a pattern formed together by a plurality of displays $301_1$ to $301_9$, such as the pattern shown in FIG. 5, for example. Naturally, the number of transparent displays $301_1$ to $301_9$ in this case is significantly higher than what is illustrated in FIG. 5.

The described patterns are not restricted to the use in a 3D calibration body; instead, they can find use in any calibration object, for example also a plane calibration object.

Figure 6:
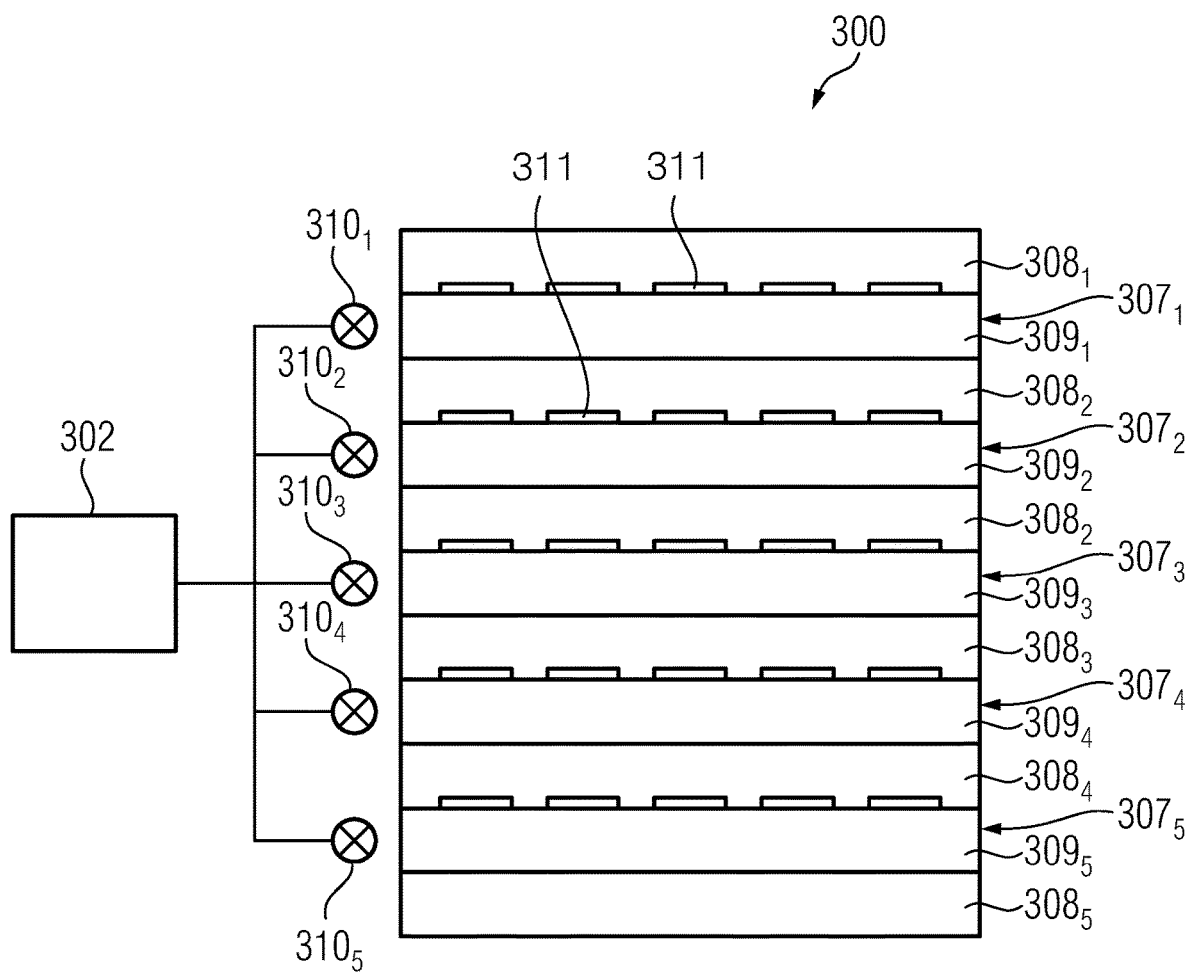
FIG. 6 shows a cross section of a 3D calibration body, which is constructed from a number of light guide layers.

A further example of a calibration object 300 in the form of a 3D calibration body is illustrated in FIG. 6. This calibration body, too, is once again substantially cuboid and constructed from transparent layers. In contrast to the 3D calibration body of FIG. 5, the 3D calibration body, however, does not consist of a stack of transparent displays but, instead, is constructed from stacked light guides $307_1$ to $307_5$. The light guides $307_1$ to $307_5$ are formed by alternating transparent layers 308, 309, with the layers $309_1$ to $309_5$ having a higher refractive index than the layers $308_1$ to $308_5$ arranged therebetween. Via selectively switchable light sources $310_1$ to $310_5$, light is coupled into the layers $309_1$ to $309_5$ in such a way that it undergoes total-internal reflection at the interfaces between the layers 308 and 309. Total-internal reflection can be obtained by virtue of the high refractive index of the layers $309_1$ to $309_5$ and the low refractive index of the layers $308_1$ to $308_5$ and the incoming radiation direction of the light being matched to one another in such a way that the critical angle for total-internal reflection is exceeded.

There is light propagation, that is, a propagation of electromagnetic waves of the light, only within the respective light guides $307_1$ to $307_5$ on account of the total-internal reflection at the interfaces between the layers 308 and 309. By contrast, the electromagnetic fields of the light decrease exponentially in the layers $308_1$ to $308_5$ with the low refractive index, and so no propagation of the light occurs in these layers. The exponentially decaying electromagnetic fields are also referred to as evanescent fields.

In order to be able to represent calibration marks in the light guides $307_1$ to $307_5$ of the 3D calibration body, thin films 311 are applied at certain distances on the layers $309_1$ to $309_5$. Here, the refractive index of these films 311 is chosen in such a way that the total-internal reflection is suppressed at these points such that there is light propagation into the layers $308_1$ to $308_5$ with a low refractive index. By way of example, to this end, the refractive index of the films 311 has a value lying between the high refractive index of the layers 309 and the low refractive index of the layers 308.

If light is now coupled into one of the light guides $307_1$ to $307_5$, the light is output coupled from the light guide $307_1$ to $307_5$ at those points at which the films 311 have been applied such that luminous points arise in the volume of the transparent body constructed from the layers 308, 309, the luminous points serving as calibration marks. The luminous points arise at different depths of the transparent body depending on which light source $310_1$ to $310_5$ is activated. In order to be able to individually choose the depth at which calibration marks should be represented, the individual light sources $310_1$ to $310_5$ are selectively activatable and deactivatable via a controller 302.

In the example illustrated in FIG. 6, light is output coupled from the light guides $307_1$ to $307_5$ by virtue of locally films 311 with a suitable refractive index being applied to the layers 309 with the high refractive index. However, it is alternatively also possible to achieve output coupling by virtue of the angle of incidence of the light on the interface between the layers 308 and 309 being modified locally in such a way that the critical angle for total-internal reflection is undershot at the corresponding points. By way of example, a local change in the angles of incidence can be produced by virtue of the orientation of the interface between the layers 308 and 309 being structured locally via lasers, via impressing, via boring, via etching or via other suitable structuring methods.

In respect of the films 311 that assist with the output coupling, it is also possible to generate the output coupling not by way of the suitable choice of a refractive index but by virtue of the evanescent fields inducing an emission of electromagnetic waves in the thin films, for example by virtue of exciting fluorescence.

FIGS. 7 to 11 show flowcharts of methods for calibrating an optical observation apparatus 100. The optical observation apparatus 100 is embodied as a surgical microscope and includes a stand 201, to which the optical observation unit 102 of the surgical microscope is connected. A calibration object 300 is arranged in a fixed location directly on the stand 201. By way of example, the surgical microscope may be embodied as described above with reference to FIGS. 1 to 4. The calibration object can be embodied as a two-dimensional calibration pattern or a three-dimensional calibration body or it can be part of the stand 201.

Figure 7:
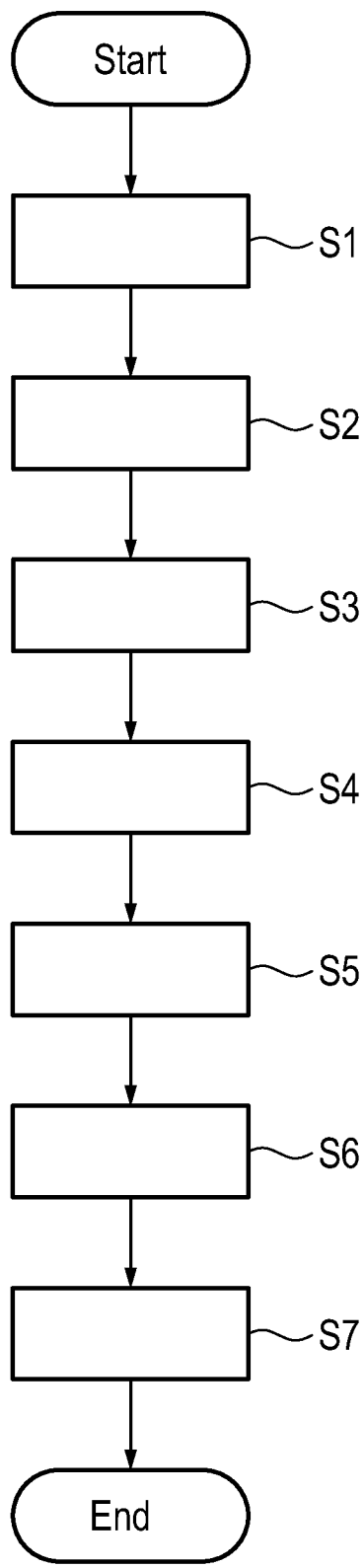
FIG. 7 shows a flowchart of a method for calibrating an optical observation apparatus.

The method described with reference to FIG. 7 serves to adjust a diopter setting on an eyepiece 104 of the optical observation unit 102. After the start of the method, for example, by way of the user operating a switch or a pushbutton, the optical observation unit 102 is aligned in automated fashion with respect to the calibration object 300 in step S1 such that the calibration object 300, which is a two-dimensional calibration pattern, is observable via the optical observation unit 102. By way of example, the alignment can be implemented by driving to a specifiable reference position via the motor-driven stand 201.

In step S2, which can be carried out after or at the same time as step S1, the optical observation unit 102 independently sets its maximum magnification.

In step S3, the calibration object 300 is illuminated or, should this be a self-luminous calibration object, it is activated. In the case of positioning in the z-direction that is too inaccurate (the Z-direction extends parallel to the optical axis of the surgical microscope), the surgical microscope can be refocused, for example, via a varioscope and image evaluation.

In step S4, a recording of the calibration object 300, for example, a photographic recording, is produced via the camera 103 of the optical observation unit 102.

The produced recording is evaluated in step S5 such that the focus can be set in step S6. In step S7, the zoom objective of the surgical microscope is set to the lowest magnification and the user is invited to put the image displayed to them in focus. With this, the method is completed.

Once the user has adapted the eye spacing, they can peer through the eyepiece and focus both partial images by rotating the diopter adjustment ring on the eyepiece.

Figure 8:
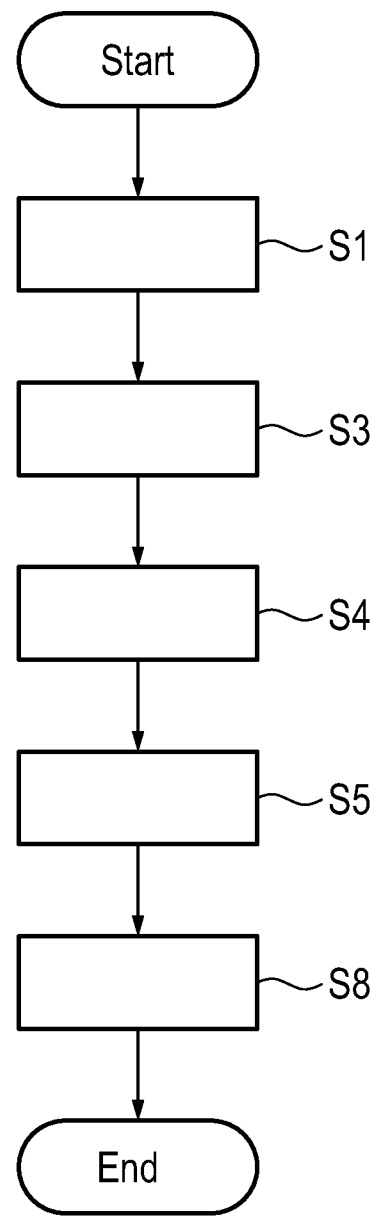
FIG. 8 shows a flowchart of a further method for calibrating an optical observation apparatus.

In FIG. 8, a flowchart of a further method for calibrating an optical observation apparatus 100 is illustrated. The calibration method serves to calibrate cameras of the optical observation unit 102 of the optical observation apparatus 100. In this example, the calibration object is embodied as a three-dimensional calibration body, for example as described above with reference to FIGS. 5 and 6.

After the start of the method, the optical observation unit 102 is aligned with respect to the calibration object 300 in step S1 such that the calibration object 300 is observable via the optical observation unit 102. By way of example, the alignment can be implemented by driving to a specifiable reference position via the motor-driven stand 201.

In step S3, the calibration object 300 is illuminated or, should this be a self-luminous calibration object, it is activated. In step S4, recordings of the calibration object 300, for example, photographic recordings, are produced via the camera 103 of the optical observation unit 102. Here, it is possible to produce recordings at different focal planes when necessary.

The recordings produced are evaluated in step S5. By way of example, it is possible to ascertain the relative position of the optical observation unit 102 with respect to the calibration object 300. Now, various calibration steps can be carried out in step S8; by way of example, a correction factor can be ascertained corresponding to the ascertained relative position and can be included in algorithms, or settings can be adjusted accordingly. With this, the method is completed.

Figure 9:
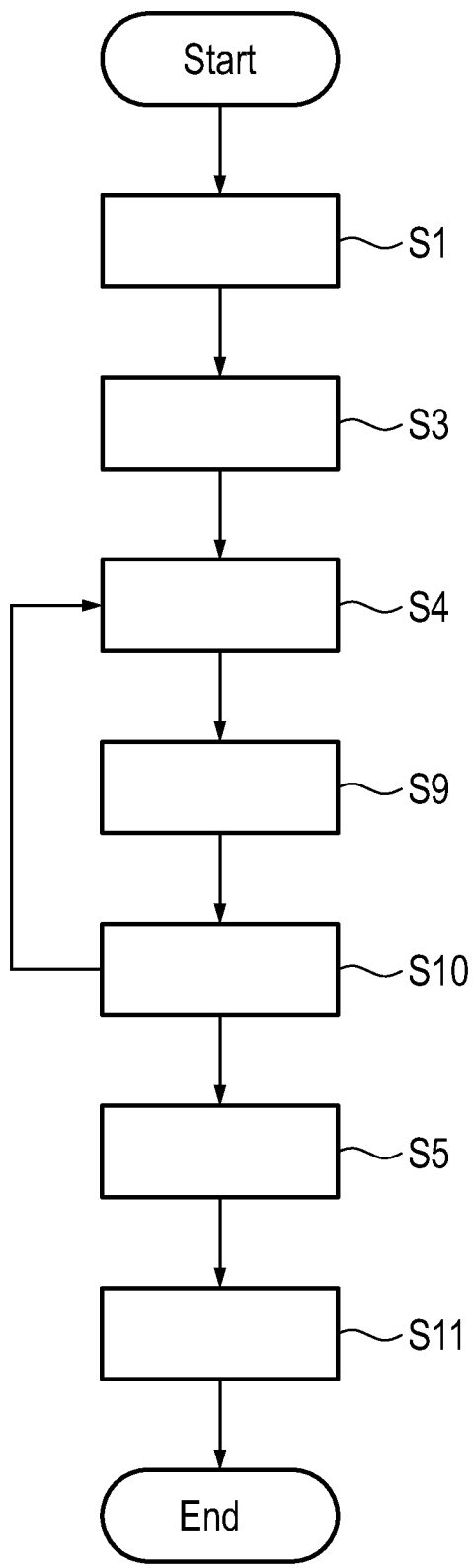
FIG. 9 shows a flowchart of a further method for calibrating an optical observation apparatus.

FIG. 9 shows a flowchart of a further method for calibrating an optical observation apparatus 100, which serves the intrinsic calibration of a surroundings camera 103 for the purposes of tracking instruments. The surroundings camera 103 has a fixed focal length and includes no zoom system. The calibration object is embodied as a checkerboard pattern.

After the start of the method, the optical observation unit 102 is aligned with respect to the calibration object 300 in step S1 such that the calibration object 300 is observable via the surroundings camera 103, that is, is situated in the field of view of the surroundings camera 103. By way of example, the alignment can be implemented by driving to a specifiable reference position via the motor-driven stand 201. In step S3, the calibration object 300 is illuminated or, should this be a self-luminous calibration object, it is activated.

In step S4, a photographic recording of the calibration object 300 is produced via the surroundings camera 103 of the optical observation unit 102. The recorded image or the photo recording is stored in subsequent step S9, for example, in a memory unit assigned to a data processing unit of the optical observation apparatus 100.

In step S10, the optical observation unit 102 is moved relative to the calibration object 300. By way of example, the angle of the observation angle can be tilted. Subsequently, the method returns to step S4 and another recording of the calibration object 300 is produced. Steps S4, S9, and S10 are repeated until recordings of the calibration object 300 have been produced and stored in the complete image region of the surroundings camera 103 under different angles. Once this is the case, the method proceeds from step S10 to step S5.

In step S5, the recordings produced are evaluated; that is, the intrinsic calibration is calculated from the recorded images and stored in the surroundings camera 103 or in the memory unit. A recording log can be produced in the optional step S11, in which, for example, the movements of the optical observation unit 102 are noted such that the same movements can be carried out in each further intrinsic calibration.

In one variant of the method described in relation to FIG. 9, it is possible to carry out a hand/eye calibration. In contrast with the intrinsic calibration described above with reference to FIG. 9, it is possible to additionally store the so-called tool center point (TCP) of the optical observation apparatus 100 with each image and take this into account when ascertaining correction factors. The tool center point can refer to and be understood as a point situated at the end of a kinematic chain of the target system, that is, at the end effector, to which the positioning requirements resulting from a stated problem apply.

Via the hand/eye calibration, it is possible to ascertain how the image plane (chip) of the camera is physically assembled with respect to the TCP. This represents an extrinsic calibration. To this end, recordings of the calibration object are produced, wherein the position of the TCP is also registered for each recording. During the next recording, the observation angle and hence also the TCP are altered such that value pairs arise, which include an estimate of the camera position relative to the calibration object and the respective TCP. As a result, the absolute and fixed position of the image plane with respect to the TCP can be calculated by way of mathematical optimization methods. A calculation process can be gathered from the following publication: "A New Technique for Fully Autonomous and Efficient 3D Robotics Hand/Eye Calibration", Tsai and Lenz, IEEE Transactions on Robotics and Automation, vol. 5, no. 3, June 1989.

Figure 10:
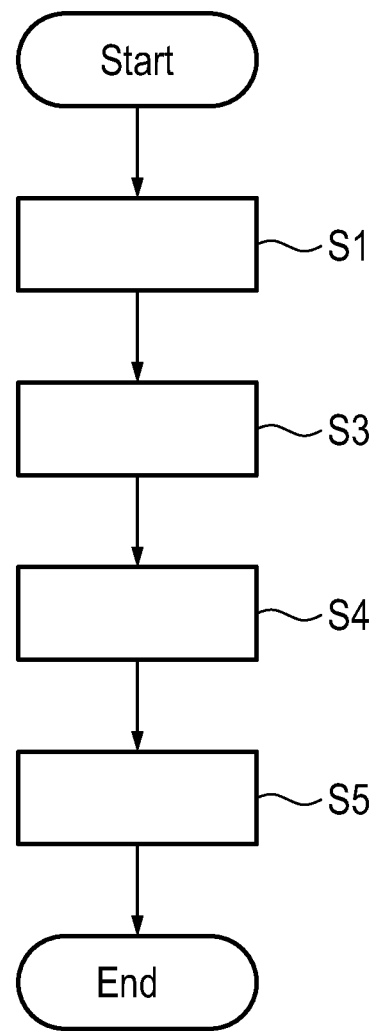
FIG. 10 shows a flowchart of a further method for calibrating an optical observation apparatus; and, FIG. 11 shows a flowchart of a further method for calibrating an optical observation apparatus.

In FIG. 10, a flowchart of a further method for calibrating an optical observation apparatus 100 is illustrated. The calibration method serves to calibrate internal cameras of the optical observation unit 102 of the optical observation apparatus 100 for topography and/or augmentation applications. This method can be carried out under the assumption that the optical observation apparatus 100 was already intrinsically and extrinsically calibrated following the production at the factory and there only has to be a re-calibration in situ in accordance with the description below, for example, on a daily basis prior to the first use or following servicing of and/or maintenance work on the optical observation apparatus 100.

After the start of the method, the optical observation unit 102 is aligned with respect to the calibration object 300 in step S1 such that the calibration object 300 is observable via the optical observation unit 102. By way of example, the alignment can be implemented by driving to a specifiable reference position via the motor-driven stand 201.

In optional step S3, the calibration object 300 is illuminated or, should this be a self-luminous calibration object, it is activated. In step S4, recordings of the calibration object 300, for example, photographic recordings, are produced via the internal camera 103 of the optical observation unit 102.

The recordings produced are evaluated in step S5. By way of example, correction factors can be calculated and updated. With this, the method is completed.

Figure 11:
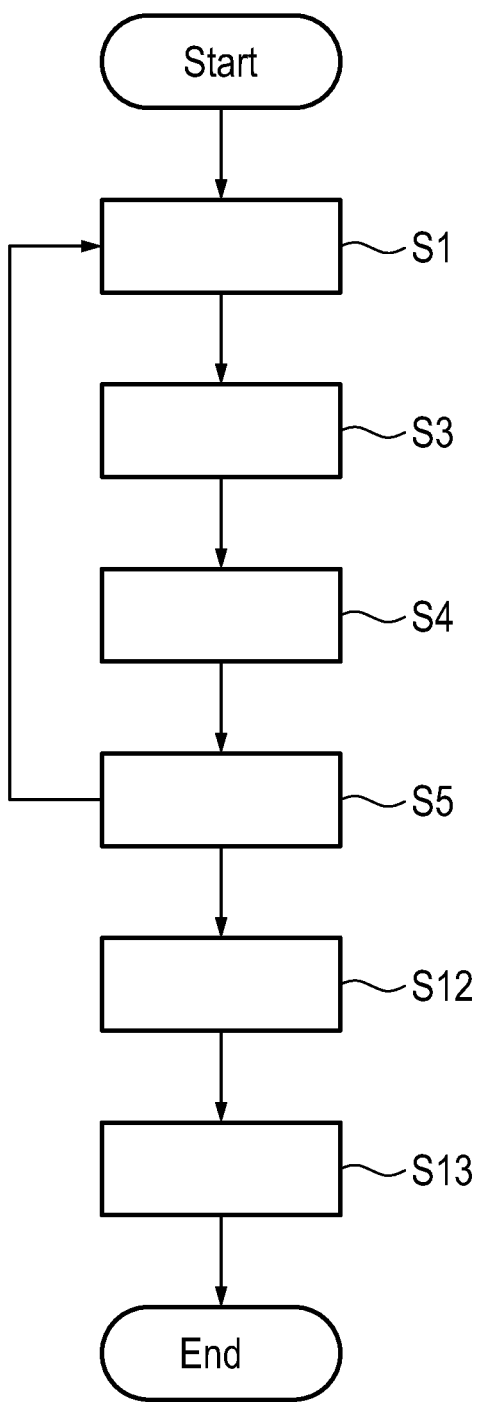

In FIG. 11, a flowchart of a further method for calibrating an optical observation apparatus 100 is illustrated. The calibration method serves to calibrate the kinematics of the stand 201 of the optical observation apparatus 100. To this end, one or more calibration objects are arranged on or near the base of the stand 201, the positions of the calibration objects on the stand 201 and the positioning thereof relative to one another being known.

After the start of the method, the optical observation unit 102 is aligned with respect to the calibration object 300 in step S1 such that the calibration object 300 is observable via the optical observation unit 102. The alignment is brought about via the motor-driven stand 201.

In optional step S3, the calibration object 300 is illuminated or, should this be a self-luminous calibration object, it is activated. In step S4, a recording of the calibration object 300, for example, a photographic recording, is produced via a camera 103 of the optical observation unit 102.

In step S5, the recording produced is evaluated and the position of the optical observation unit 102 relative to the calibration object 300 is ascertained. Subsequently, the method can return to step S1 and a new position, not adopted previously, is adopted relative to the calibration object 300; that is, the optical observation unit 102 is aligned anew.

Once steps S1 to S5 have been carried out a sufficient number of times for the first calibration object 300, that is, once a sufficient number of different orientations between optical observation unit 102 and calibration object 300 have been analyzed, the method proceeds with step S12. In step S12, steps S1 to S5 are repeated, depending on requirements, for each further calibration object should a plurality of calibration objects be used.

In step S13, the parameters of the kinematics of the stand 201 are ascertained and optimized in such a way that the measured positions relative to the calibration object correspond to the values calculated by the kinematics.

In one variant, a calibration of the camera 103 and the kinematics can also be carried out simultaneously by virtue of the camera parameters additionally being incorporated in the optimization. The orientations with which the optical observation apparatus 100 aligns with respect to the calibration object or objects can be fixedly specified or can be ascertained online on the basis of previous results. As a result, the influence of still unknown or suboptimal parameters on the result can be increased and hence the number of orientations still necessary can be kept as low as possible.

The calibration object or objects 300 need not necessarily be arranged at the base of the stand 201. Alternatively, they can also be arranged at any other point on the stand 201. Hence, this only allows a calibration of the kinematic parameters of the stand links between the calibration object 300 and the optical observation unit 102 but, in return, these can be calibrated independently of the other parameters. Naturally, any combination of positions of the calibration objects 300 and/or a multi-stage procedure are also possible in order to be able to optimize the time outlay for calibration of the stand kinematics.

The present invention has been explained in detail on the basis of exemplary embodiments for explanatory purposes. However, a person skilled in the art will appreciate that they may depart from details of these exemplary embodiments.

Since it is possible to deviate from the individual described exemplary embodiments in a manner evident to a person skilled in the art, the present invention should not be restricted by the described exemplary embodiments, but merely by the attached claims.

LIST OF REFERENCE SIGNS

100 Optical observation apparatus
102 Optical observation unit
103 Camera
104 Eyepiece
201 Stand
202 Actuating device
205 Stand base
206 Rollers
207 Foot brake
208 Stand column
209 Support arm
210 Spring arm
211 Mount for the optical observation unit
213 Connection element
214 Holding arm
215 Swivel arm
300 Calibration object
$301_1$ to $301_9$ Transparent display
302 Controller
303 Pixel
$303_{IT1}$ to $303_{IT4}$ Non-transparent pixel
304 Illumination panel
305 Light source
306 Diffusor plate
$307_1$ to $307_5$ Light guides
$308_1$ to $308_5$ Transparent layer with a low refractive index
$309_1$ to $309_5$ Transparent layer with a high refractive index
$310_1$ bis $310_5$ Light source
311 Film
401 Control unit
403 Control signal
404 Control signal
A Axis of rotation
B Axis of rotation
C Tilt axis
D Axis of rotation
E Swivel axis
F Tilt axis
S1 to S13 Method steps

What is claimed is:

1. A stand for positioning, aligning and holding an optical observation unit, the stand comprising:
    a stand body including a mount for said optical observation unit;
    a calibration object arranged directly on said stand body at a fixed location;
    said optical observation unit having a plurality of cameras; and,
    said calibration object being arranged so as to be observable from different viewing angles by said plurality of cameras of said optical observation unit.

2. The stand of claim 1, wherein said calibration object is a two-dimensional calibration pattern.

3. The stand of claim 1, wherein said calibration object is a three-dimensional calibration body.

4. The stand of claim 1, wherein said calibration object is part of said stand body.

5. An optical observation apparatus comprising:
    an optical observation unit having a plurality of cameras;
    a stand for positioning, aligning and holding said optical observation unit and said stand including a mount for said optical observation unit;
    a calibration object arranged directly on said stand at a fixed location;
    said optical observation unit being connected to said stand via said mount; and,
    said calibration object being arranged so as to be observable from different viewing angles by said plurality of cameras of said optical observation unit.

6. The optical observation apparatus of claim 5 further comprising:
    a control unit configured to output control signals to at least one of said stand and said optical observation unit in order to carry out a calibration method.

7. The optical observation apparatus of claim 5, wherein said optical observation unit is a surgical microscope.

8. An optical observation apparatus comprising:
    an optical observation unit having a camera;
    a stand for positioning, aligning and holding said optical observation unit and said stand including a mount for said optical observation unit;
    a calibration object arranged directly on said stand at a fixed location;
    said optical observation unit being connected to said stand via said mount; and,
    said calibration object being arranged so as to be observable from different viewing angles by said camera of said optical observation unit.

9. A method for calibrating an optical observation unit apparatus including: an optical observation unit having a camera; a stand for positioning, aligning and holding the optical observation unit and the stand including a mount for said optical observation unit; a calibration object arranged directly on the stand at a fixed location; the optical observation unit being connected to the stand via the mount; and, the calibration object being arranged so as to be observable from different viewing angles by the camera of the optical observation unit, the method comprising:
    making recordings of the calibration object via the camera of the optical observation unit; and,
    evaluating the recordings to provide evaluated recordings.

10. The method of claim 9 further comprising:
    aligning the optical observation unit with respect to the calibration object.

11. The method of claim 10, wherein said aligning the optical observation unit is performed in an automated manner.

12. The method of claim 9 further comprising:

carrying out an adjustment of a diopter setting on an eyepiece of the optical observation unit using the evaluated recordings.

13. The method of claim 9 further comprising:

calibrating the camera of the optical observation unit using the evaluated recordings.

14. The method of claim 9 further comprising:

performing an intrinsic calibration of the camera of the optical observation unit using the evaluated recordings.

15. The method of claim 9 further comprising:

performing a hand/eye, calibration of the camera of the optical observation unit using the evaluated recordings.

16. The method of claim 9 further comprising:

performing an extrinsic calibration of internal cameras for at leas one of topography applications and augmentation applications using the evaluated recordings.

17. The method of claim 9 further comprising:

calibrating kinematics of the stand using the evaluated recordings.

18. The method of claim 9, wherein the optical observation unit has a plurality of cameras and the plurality of cameras is used for making the recordings of the calibration object.

* * * * *

UNITED STATES PATENT AND TRADEMARK OFFICE
CERTIFICATE OF CORRECTION

PATENT NO. : 11,977,212 B2
APPLICATION NO. : 17/100406
DATED : May 7, 2024
INVENTOR(S) : A. Raab et al.

It is certified that error appears in the above-identified patent and that said Letters Patent is hereby corrected as shown below:

In the Claims

In Column 21:
Line 18: Claim 15, delete "hand/eye, calibration" and substitute — hand/eye calibration — therefor.

Signed and Sealed this
Seventeenth Day of September, 2024

Katherine Kelly Vidal
*Director of the United States Patent and Trademark Office*